W. SCHMID.
FISHING REEL.
APPLICATION FILED MAY 15, 1911.
1,047,993.
Patented Dec. 24, 1912.
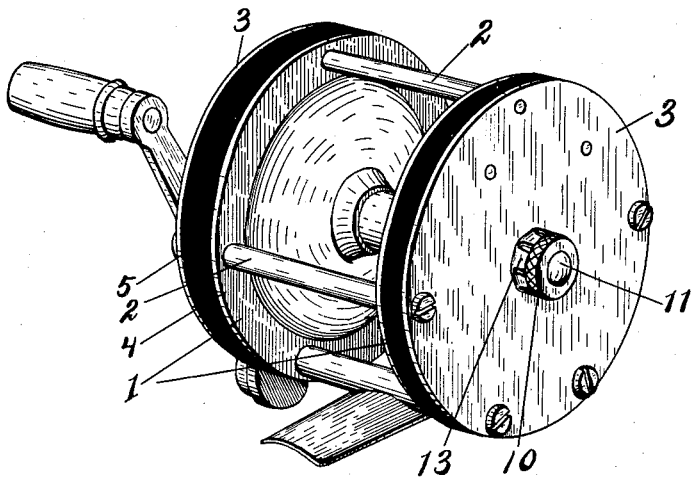
Fig. I.
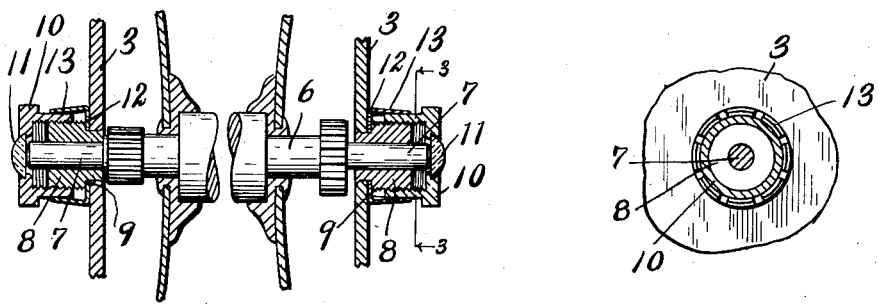
Fig. II.  Fig. III.
Witnesses
Luella Greenfield
M. P. Woodruff
Inventor
William Schmid
By Chappell Earl
Attorney

UNITED STATES PATENT OFFICE.

WILLIAM SCHMID, OF KALAMAZOO, MICHIGAN, ASSIGNOR TO WILLIAM SHAKESPEARE, JR., COMPANY, OF KALAMAZOO, MICHIGAN.

FISHING-REEL.

1,047,993.           Specification of Letters Patent.     Patented Dec. 24, 1912.

Application filed May 15, 1911. Serial No. 627,236.

*To all whom it may concern:*

Be it known that I, WILLIAM SCHMID, a citizen of the United States, residing at the city of Kalamazoo, county of Kalamazoo, and State of Michigan, have invented certain new and useful Improvements in Fishing-Reels, of which the following is a specification.

This invention relates to improvements in fishing reels.

I have illustrated my improvements embodied in a reel having the frame structure of the Shakespeare Patent No. 801,479. My improvements are particularly desirable for use in structures having frames of this character on account of the great accuracy required to secure perfect bearings for the spool, and on account of the liability of the rubber and metal portions of the frame to vary somewhat in their relative contraction and expansion under weather conditions or use which may cause the frames to spring slightly. My improvements are, however, adapted for use and capable of embodiment in various forms of reel frames. The springing of the frame or some part thereof, is likely to occur in any form of frame structure, either during the steps of manufacturing the parts and assembling, or after the reel has been put into use, and sometimes after a reel has been completely assembled and adjusted but before it is used.

The main objects of this invention are,—first, to provide in a fishing reel, improved spool bearings adapted to be adjusted to center the spool in the reel frame. Second, to provide in a fishing reel, an improved bearing which avoids the necessity of great accuracy in manufacture of parts and may be adjusted to compensate for wear or the springing of the frame. Third, to provide in a fishing reel an improved bearing embodying these advantages, which is very simple and economical in structure.

Further objects, and objects relating to structural details, will definitely appear from the detailed description to follow.

I accomplish the objects of my invention by the devices and means described in the following specification.

The invention is clearly defined and pointed out in the claim.

A structure which is a preferred embodiment of my invention is clearly illustrated in the accompanying drawing, forming a part of this invention, in which:

Figure I is a perspective view of a structure embodying the features of my invention. Fig. II is an enlarged detail longitudinal section through the structure shown in Fig. I, the spool shaft and pinions thereon being shown in full lines. Fig. III is a detail section taken on a line corresponding to line 3—3 of Fig. II looking in the direction of the little arrows at the ends of the section line.

In the drawing similar reference numerals refer to several parts throughout the several views.

Referring to the drawing 1—1 are the heads of the reel frame, the heads being connected by suitable pillars 2. The heads in the structure illustrated comprise end plates 3, the inner rings 4, and the intermediate rings 5, the frame structure illustrated being that of the patent to Shakespeare referred to. The spool shaft 6 is provided with journals 7 at each end. The details of the driving and click mechanism are not here illustrated as they form no part of this invention. The spool shaft bearings 8 are mounted on the end plates 3, being preferably shouldered at 9 and upset riveted to the plates as illustrated in Fig. II. The bearing caps 10 are provided with thrust bearings 11 for the ends of the spool shaft, the bearings 11 illustrated being agate bearings. The caps 10 are threaded upon the bearings 8, and are retained in their adjusted positions thereon by means of the friction lock members 12. The members 12 are cup-like in form, and are preferably retained by arranging them on the reduced portions of the bearings and clamping between the shoulders 9 thereof, and the end plates as is shown in Fig. II. The side portions of the friction members are longitudinally slitted to provide a plurality of spring cap engaging fingers 13. These members 12 do not detract from the appearance of the reel, and are inexpensive; indeed, the cost of the members 12 is found to be considerably less than the extra labor it saves in accurate fitting and assembling the parts where the bearing caps are not adjustable. By providing the bearing caps at each end of the spool shaft, the spool shaft may be properly centered and the caps may be adjusted to take up for any wear or to accommodate any springing of the frame. Also in assembling of the parts, the accuracy otherwise required is not necessary as the adjustment can be secured through these thrust bearing caps 10.

I have illustrated and described my improvements in a simple and practical embodiment thereof. I am aware that my invention can be considerably modified in structural details, but as such modifications will no doubt be understood by those skilled in the art to which the invention relates, I have not attempted to illustrate or describe the same herein.

Having thus described my invention, what I claim as new and desire to secure by Letters Patent is:

In a fishing reel, the combination of a frame, comprising an end plate, a spool, a shaft therefor, a bearing for said shaft, said bearing being shouldered at its inner end to provide a reduced rivet portion and being secured to said end plate by riveting therein, a cap threaded upon said bearing, said cap being provided with an end or thrust bearing for said shaft, and a cup-like friction member arranged on the reduced portion of said bearing and clamped between the shoulder thereof and said end plate, the sides of said friction member being slit longitudinally to provide a plurality of spring cap engaging fingers embracing the sides of said cap.

In witness whereof, I have hereunto set my hand and seal in the presence of two witnesses.

WILLIAM SCHMID. [L. S.]

Witnesses:
 LUELLA G. GREENFIELD,
 PEARL E. LILLIE.